US010613370B2

(12) United States Patent
Choung et al.

(10) Patent No.: US 10,613,370 B2
(45) Date of Patent: Apr. 7, 2020

(54) SUBSTRATE, DISPLAY DEVICE INCLUDING THE SAME, AND METHOD OF MANUFACTURING THE DISPLAY DEVICE

(71) Applicant: Samsung Display Co., Ltd., Yongin-si, Gyeonggi-do (KR)

(72) Inventors: Jong Hyun Choung, Yongin-si (KR); Hong Sick Park, Yongin-si (KR); Seung Bae Kang, Yongin-si (KR); Ki Tae Kim, Yongin-si (KR); Joon Woo Bae, Yongin-si (KR); Hee Sung Yang, Yongin-si (KR)

(73) Assignee: Samsung Display Co., Ltd. (KR)

( * ) Notice: Subject to any disclaimer, the term of this patent is extended or adjusted under 35 U.S.C. 154(b) by 93 days.

(21) Appl. No.: 15/625,397

(22) Filed: Jun. 16, 2017

(65) Prior Publication Data

US 2018/0157098 A1 Jun. 7, 2018

(30) Foreign Application Priority Data

Dec. 2, 2016 (KR) .................. 10-2016-0163723

(51) Int. Cl.
*G02F 1/1335* (2006.01)
*G02F 1/1362* (2006.01)
*G02F 1/1333* (2006.01)

(52) U.S. Cl.
CPC .. *G02F 1/133512* (2013.01); *G02F 1/133502* (2013.01); *G02F 1/133514* (2013.01); *G02F 1/133516* (2013.01); *G02F 1/133528* (2013.01); *G02F 1/133553* (2013.01); *G02F 1/133621* (2013.01); *G02F 2001/133357* (2013.01);

(Continued)

(58) Field of Classification Search
None
See application file for complete search history.

(56) References Cited

U.S. PATENT DOCUMENTS

2011/0052836 A1  3/2011  Kim et al.
2015/0028294 A1* 1/2015  Kim ................. H01L 27/322
                                              257/40

(Continued)

FOREIGN PATENT DOCUMENTS

JP      2005-308847        4/2005
KR   10-2002-0031765 A    5/2002

(Continued)

*Primary Examiner* — Edward J Glick
*Assistant Examiner* — Anthony G Quash
(74) *Attorney, Agent, or Firm* — Innovation Counsel LLP

(57) ABSTRACT

There is provided a display device. The display device includes a first substrate, a second substrate that faces the first substrate, and a liquid crystal layer disposed between the first substrate and the second substrate. One of the first substrate and the second substrate includes a base substrate and a light blocking pattern disposed on a surface that faces the other surface of both surfaces of the base substrate, the light blocking pattern exposing a part of the base substrate. The light blocking pattern includes a semi-transmission reflective layer a disposed on the base substrate, a phase matching layer disposed on the semi-transmission reflective layer, and a reflective metal layer disposed on the phase matching layer. The phase matching layer and the reflective metal layer include materials having substantially the same etching rate.

31 Claims, 11 Drawing Sheets

(52) U.S. Cl.
CPC ............ *G02F 2001/133548* (2013.01); *G02F 2001/133557* (2013.01); *G02F 2001/133614* (2013.01); *G02F 2201/121* (2013.01); *G02F 2201/123* (2013.01); *G02F 2201/50* (2013.01); *G02F 2202/36* (2013.01); *G02F 2203/01* (2013.01); *G02F 2203/055* (2013.01)

(56) References Cited

U.S. PATENT DOCUMENTS

| 2015/0228232 | A1* | 8/2015 | Lee ..................... G09G 3/3607 |
| | | | 345/88 |
| 2017/0082892 | A1* | 3/2017 | Chung .............. G02F 1/133514 |
| 2017/0373282 | A1* | 12/2017 | Kim .................... H01L 51/5281 |

FOREIGN PATENT DOCUMENTS

| KR | 10-1149433 B1 | 5/2012 |
| KR | 10-2014-0059428 A | 5/2014 |

\* cited by examiner

SUBSTRATE, DISPLAY DEVICE INCLUDING THE SAME, AND METHOD OF MANUFACTURING THE DISPLAY DEVICE

CROSS-REFERENCE TO RELATED APPLICATION

This application claims priority to and the benefit of Korean Patent Application No. 10-2016-0163723, filed on Dec. 2, 2016, in the Korean Intellectual Property Office, the entire contents of which are incorporated herein by reference in their entirety.

BACKGROUND

1. Field

An embodiment of the present inventive concept relates to a substrate, a display device including the same, and a method of manufacturing the display device.

2. Description of the Related Art

A liquid crystal display (LCD) device transmits light by controlling liquid crystal molecules driven by an electric field generated by two electrodes in an LCD panel and may realize an image by the transmitted light. In addition, the LCD panel includes a liquid crystal layer including the liquid crystal molecules and two substrates arranged under and on the liquid crystal layer.

The LCD device may include a light blocking pattern arranged between pixel areas in order to improve contrast.

Recently, an external light reflection preventing function of the light blocking pattern is being studied.

SUMMARY

An embodiment of the present inventive concept relates to a substrate including a light blocking pattern capable of preventing external light from being reflected, a display device including the same, and a method of manufacturing the display device.

A substrate according to an embodiment of the present inventive concept includes a base substrate and a light blocking pattern provided on the base substrate, the light blocking pattern exposing a part of the base substrate. The light blocking pattern includes a semi-transmission reflective layer disposed on the base substrate, a phase matching layer disposed on the semi-transmission reflective layer, and a reflective metal layer disposed on the phase matching layer. The phase matching layer and the reflective metal layer have substantially the same etching rate.

The substrate further includes a transmission protective layer disposed on the reflective metal layer to transmit light and to protect the reflective metal layer.

An etching rate of a material of the transmission protective layer is substantially the same as etching rates of materials of the phase matching layer and the reflective metal layer.

The substrate further includes a color filter disposed on the base substrate exposed by the light blocking pattern. The color filter includes a quantum dot material.

The substrate further includes a first selective transmission layer disposed between the base substrate and the color filter. The first selective transmission layer blocks blue light.

The substrate further includes a second selective transmission layer that covers the color filter. The second selective transmission layer reflects yellow light.

A display device according to an embodiment of the present inventive concept includes a first substrate, a second substrate that faces the first substrate, and a liquid crystal layer disposed between the first substrate and the second substrate. The first substrate includes a base substrate and a light blocking pattern disposed on a surface of the base substrate, the light blocking pattern exposing a part of the base substrate. The light blocking pattern includes a semi-transmission reflective layer disposed on the base substrate, a phase matching layer disposed on the semi-transmission reflective layer, and a reflective metal layer disposed on the phase matching layer. The phase matching layer and the reflective metal layer include materials having substantially the same etching rate.

The display device further includes a backlight unit disposed to face the second substrate.

The backlight unit provides blue light.

A display device according to an embodiment of the present inventive concept includes a first substrate including a plurality of pixel areas, a second substrate including a second base substrate that faces the first substrate and a color realizing layer provided on one surface of the second base substrate, a liquid crystal layer disposed between the first substrate and the second substrate, and a backlight unit configured to provide light to the liquid crystal layer. The color realizing layer includes a light blocking pattern disposed on the second base substrate, the light blocking pattern exposing the pixel areas of the second base substrate and first through third color filters respectively disposed in the pixel areas of the second base substrate to realize different colors. At least one of the first through third color filters includes a quantum dot material and converts light of a first color that is provided by the backlight unit into light of a second color different from the first color.

The backlight unit provides blue light. The first color filter includes a quantum dot material that converts the blue light into red light. The second color filter includes a quantum dot material that converts the blue light into green light. The third color filter transmits the blue light.

The first substrate includes a first driving layer including a first base substrate and a pixel electrode disposed on one surface of the first base substrate. The second substrate further includes a second driving layer disposed on the color realizing layer and including a common electrode.

The display device further includes a first polarizing layer disposed on the first base substrate and a second polarizing layer disposed between the color realizing layer and the second driving layer.

The first polarizing layer and the second polarizing layer include a wire grid polarizer (WGP).

The display device further includes a planarization layer arranged between the color realizing layer and the second driving layer.

A method of manufacturing a display device according to an embodiment of the present inventive concept includes providing a first substrate, providing a second substrate that faces the first substrate, and arranging a liquid crystal layer between the first substrate and the second substrate. The providing of one of the first substrate and the second substrate includes forming a light blocking pattern that exposes a part of a base substrate on the base substrate and forming a color filter on the base substrate exposed by the light blocking pattern. The forming of the light blocking pattern includes sequentially forming a semi-transmission reflective layer, a phase matching layer, and a reflective metal layer on the base substrate and etching the semi-transmission reflective layer, the phase matching layer, and the reflective metal layer at one time. The phase matching layer and the reflective metal layer include materials having substantially the same etching rate.

According to an embodiment of the present inventive concept, a substrate of a display device may include a light blocking pattern that prevents external light from being reflected. The light blocking pattern has a stacked structure. Etching rates of the respective layers are substantially the same and an etch profile of the light blocking pattern obtained by performing an etching process may be uniform. In addition, since the etching rates of the respective layers of the light blocking pattern are substantially the same, the respective layers may be etched at one time.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Example embodiments will now be described more fully hereinafter with reference to the accompanying drawings.

Figure 1:
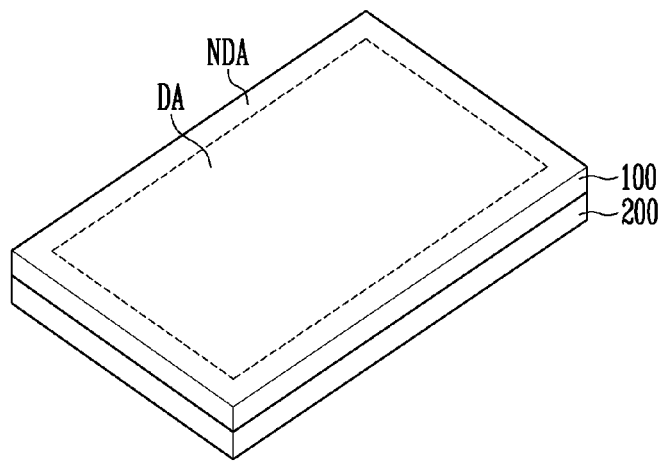
FIG. 1 is a perspective view illustrating a display device according to an embodiment of the present inventive concept.
Figure 2:
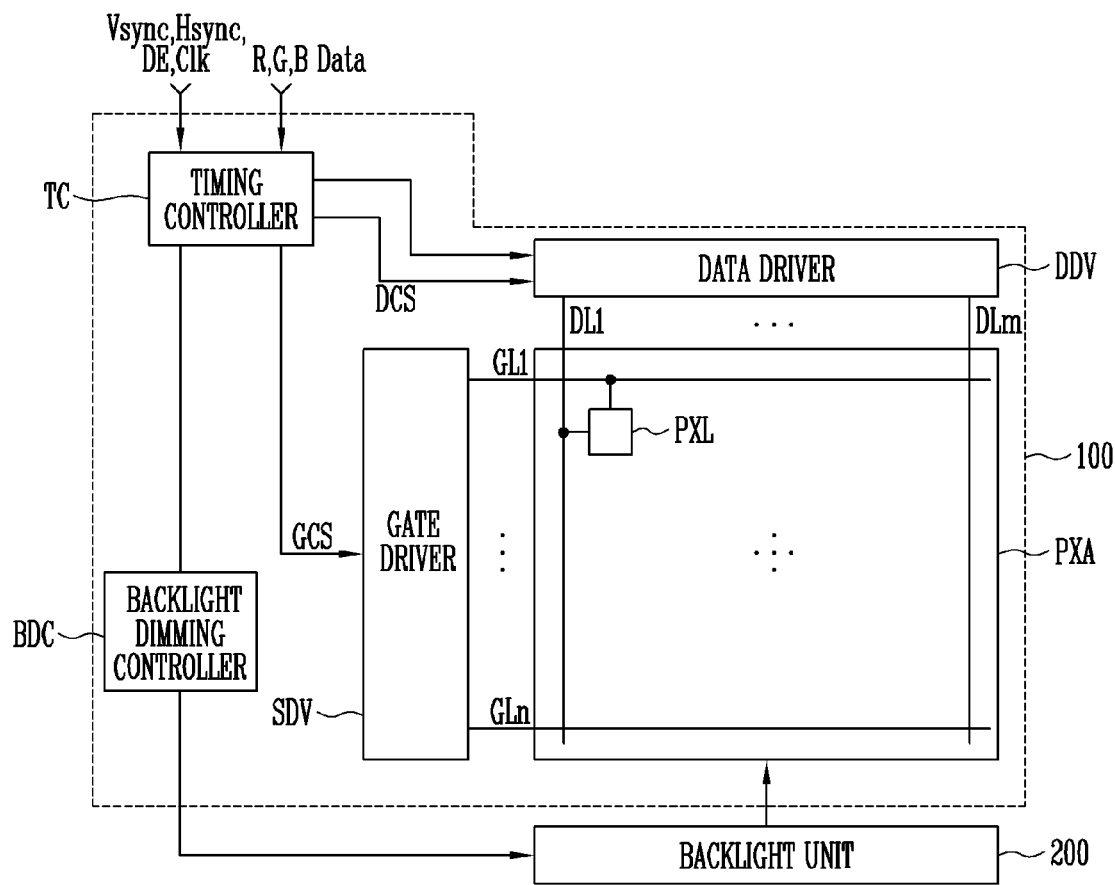
FIG. 2 is a block diagram schematically illustrating the display device of FIG. 1.

FIG. 1 is a perspective view illustrating a display device according to an embodiment of the present inventive concept. FIG. 2 is a block diagram schematically illustrating the display device of FIG. 1.

Referring to FIGS. 1 and 2, the display device may have one of various shapes. For example, the display device may be a closed polygon including sides of straight lines, a circle or an ellipse including a side of a curved line, or a semi-circle or a semi-ellipse including a side of a straight line and a side of a curved line. In FIG. 1 the display device is illustrated as being rectangular.

The display device may include a display panel 100 and a backlight unit 200.

The display panel 100 may be one of a liquid crystal display (LCD) panel, an electrophoretic display (EPD) panel, an electrowetting display (EWD) panel, and an organic light emitting display (OLED) panel. On the other hand, when the display panel 100 is the OLED panel, since the OLED panel is a self-emission display panel, the backlight unit 200 may be omitted. Hereinafter, for convenience sake, the LCD panel is used as the display panel 100.

The display panel 100 may include a display area DA and a non-display area NDA.

In the display area DA, a pixel unit PXA is provided so that an image is displayed. The display area DA may have a shape corresponding to that of the display panel 100. For example, the display area DA may be a polygon including sides of straight lines, a circle or an ellipse including a side of a curved line, or a semi-circle or a semi-ellipse including a side of a straight line and a side of a curved line. In FIG. 1, the display area DA is illustrated as being rectangular.

The pixel unit PXA may include a plurality of pixels PXL connected to gate lines GL1 through GLn and data lines DL1 through DLm. Each pixel PXL may be connected to a corresponding gate line among the gate lines GL1 to GLn and a corresponding data line among the data lines DL1 to DLm.

The non-display area NDA may be provided at least at one side of the display area DA. For example, the non-display area NDA may be provided outside the display area DA to surround the display area DA.

In the non-display area NDA, at least one among a timing controller TC, a gate driver SDV, a data driver DDV, and a backlight dimming controller BDC, for example, the gate driver SDV may be provided. The data driver DDV, the timing controller TC, and the backlight dimming controller BDC may be arranged outside the display panel 100. In addition, the data driver DDV, the timing controller TC, and the backlight dimming controller BDC may be arranged in a part of the non-display area NDA.

The timing controller TC may receive digital video data R, G, B Data from an external system (not shown) through an interface such as a low voltage differential signaling (LVDS) interface or a transition minimized differential signaling (TMDS) interface. In addition, the timing controller TC may receive a vertical synchronizing signal Vsync, a horizontal synchronizing signal Hsync, a data enable signal DE, and a clock signal Clk from the external system. The timing controller TC may generate a gate control signal GCS and a data control signal DCS for respectively controlling the gate driver SDV and the data driver DDV by using the above signals.

The gate driver SDV may supply scan signals to the gate lines GL1 to GLn in response to the gate control signal GCS generated by the timing controller TC. For example, the gate driver SDV may sequentially supply the scan signals to the gate lines GL1 to GLn. When the scan signals are sequentially supplied to the gate lines GL1 to GLn, the pixels PXL may be selected in units of horizontal lines.

Or, the gate driver SDV may supply the scan signals to a plurality of gate lines among the gate lines GL1 to GLn.

The data driver DDV may supply data signals by one line to the data lines DL1 to DLm during every horizontal period in response to the data control signal DCS generated by the timing controller TC. The data signals supplied to the data lines DL1 to DLm may be supplied to the pixels PXL selected by the scan signals. For this purpose, the data driver DDV may supply the data signals to the data lines DL1 through DLm in synchronization with the scan signals.

The backlight dimming controller BDC may determine a dimming duty of a light source (not shown) provided in the backlight unit 200.

The backlight unit 200 may be provided in an opposite direction of an emission surface of the display panel 100, for example, under the display panel 100. The backlight unit 200 is driven by the backlight dimming controller BDC and may uniformly irradiate light onto the display panel 100. Here, the backlight unit 200 may be a direct type backlight unit or an edge type backlight unit.

Figure 3A:
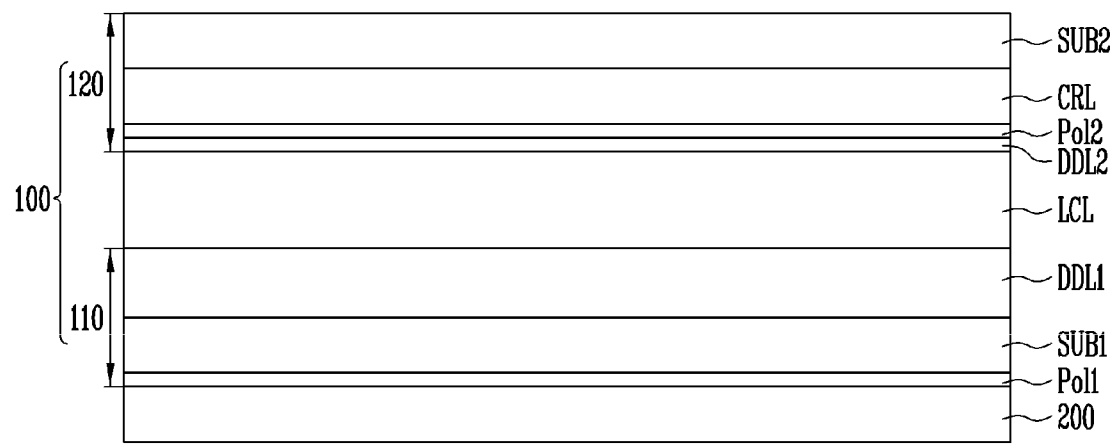
FIGS. 3A and 3B are cross-sectional views schematically illustrating the display device of FIG. 1.
Figure 3B:
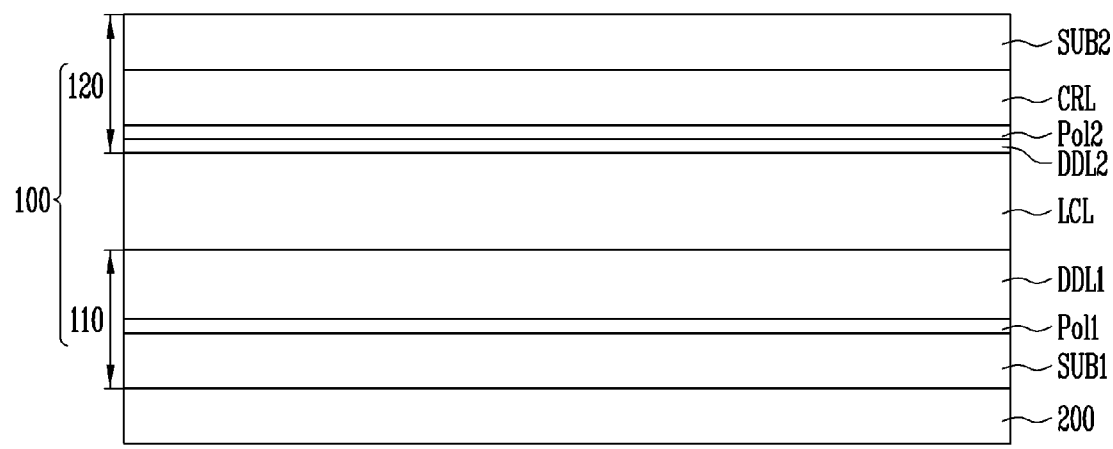
Figure 4A:
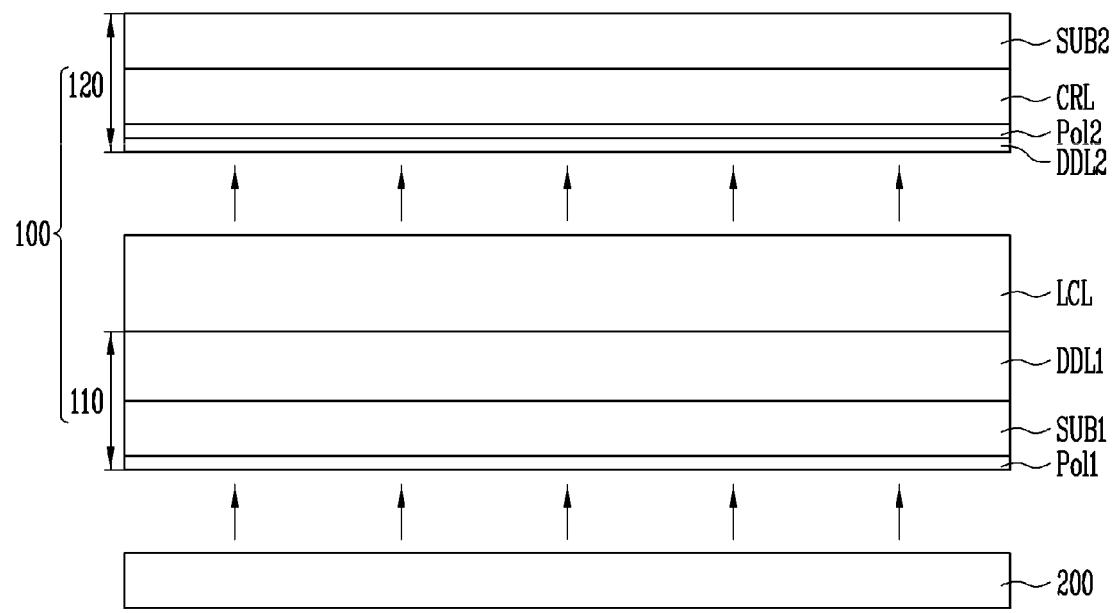
FIGS. 4A and 4B are views illustrating a travelling direction of light in the display device of FIGS. 3A and 3B.
Figure 4B:
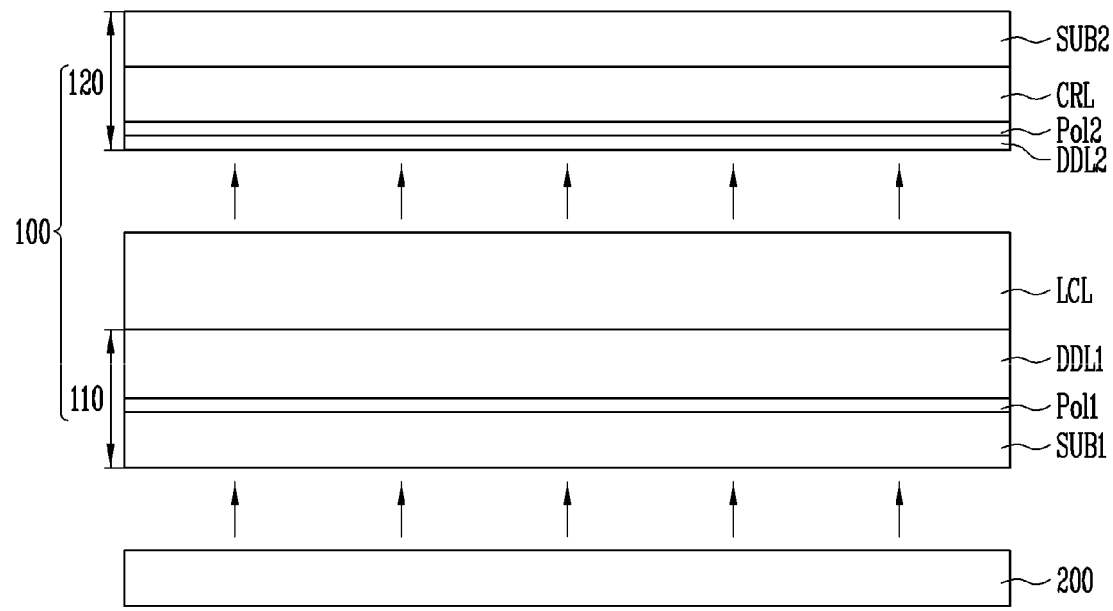

FIGS. 3A and 3B are cross-sectional views schematically illustrating the display device of FIG. 1. FIGS. 4A and 4B are views illustrating a travelling direction of light in the display device of FIGS. 3A and 3B.

Referring to FIGS. 1, 2, 3A, 3B, 4A, and 4B, the display device may include the display panel 100 and the backlight unit 200 provided under the display panel 100.

The display panel 100 may include a first substrate 110, a second substrate 120, and a liquid crystal layer LCL.

The first substrate 110 may include a first base substrate SUB1, a first driving layer DDL1 arranged on the first base substrate SUB1, and a first polarizing layer Pol1.

The first base substrate SUB1 includes a transparent insulating material and may transmit light. The first base substrate SUB1 may be a rigid substrate. For example, the first base substrate SUB1 may be one of a glass substrate, a quartz substrate, a glass ceramic substrate, and a crystalline glass substrate.

In addition, the first base substrate SUB1 may be a flexible substrate. Here, the first base substrate SUB1 may be one of a film substrate and a plastic substrate each including a polymeric organic material. For example, the first base substrate SUB1 may include at least one among polystyrene, polyvinyl alcohol, polymethyl methacrylate (PMMA), polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. The material that forms the first base substrate SUB1 may vary and the first base substrate SUB1 may be formed of fiber reinforced plastic (FRP).

The material used for the first base substrate SUB1 may have resistance (or heat resistance) against a high processing temperature in manufacturing processes.

In each pixel PXL, the first driving layer DDL1 may include at least one thin film transistor (TFT) (not shown) and a pixel electrode (not shown) connected to the TFT. The plurality of pixels PXL as minimum units that display an image may be provided in the pixel unit PXA.

The first polarizing layer Pol1 polarizes light supplied from the backlight unit 200 in a specific direction and may provide the polarized light to the liquid crystal layer LCL.

The first polarizing layer Pol1 may be arranged between the first base substrate SUB1 and the backlight unit 200. That is, the first polarizing layer Pol1 may be arranged on an external surface of the first base substrate SUB1. When the first polarizing layer Pol1 is arranged between the first base substrate SUB1 and the backlight unit 200, the first polarizing layer Pol1 may include a polarizing film.

In addition, the first polarizing film Pol1 may be arranged between the first base substrate SUB1 and the first driving layer DDL1. When the first polarizing film Pol1 is arranged between the first base substrate SUB1 and the first driving layer DDL1, the first polarizing layer Pol1 may include a wire grid polarizer (WGP). The WGP may be formed of a regular array of fine metal wires that run parallel with each other. The WGP may perform the same function as a common polarizer. That is, in the WGP, a material that forms the WGP is not formed by elongation but the metal wires are arranged at intervals of no more than a wavelength of incident light so that patterning may be easily performed. The WGP may be easily formed by patterning performed by photolithography.

When the first polarizing film Pol1 is arranged between the first base substrate SUB1 and the first driving layer DDL1, the first substrate 110 may include a first passivation layer (not shown) arranged between the first polarizing layer Pol1 and the first driving layer DDL1.

The second substrate 120 may face the first substrate 110. The second substrate 120 may include a second base substrate SUB2, a color realizing layer CRL stacked on one surface of the second base substrate SUB2, a second polarizing layer Pol2, and a second driving layer DDL2.

The second base substrate SUB2 may include the same material as the first base substrate SUB1.

The color realizing layer CRL may be arranged on one surface of the second base substrate SUB2, for example, a surface that faces the first substrate 110. The color realizing layer CRL may include a plurality of color filters and light blocking patterns arranged between adjacent color filters.

The color filters may realize predetermined colors by using light provided by the backlight unit 200. For example, the color filters may have one color among red, green, blue, white, cyan, magenta, and yellow. At least one of the color filters may include an organic material and a quantum dot material dispersed into the organic material. The quantum dot material may convert light of a first color provided by the backlight unit 200 into light of a second color different from the first color.

According to the current embodiment, it is illustrated that the color filters are included in the color realizing layer CRL. However, the present inventive concept is not limited thereto. For example, the color filters may be integrated with the first substrate 110.

The second polarizing layer Pol2 may transmit light that passes through the liquid crystal layer LCL. The second polarizing layer Pol2 may include a WGP like the first polarizing layer Pol1.

According to the current embodiment, as illustrated in FIGS. 3A, 3B, 4A, and 4B, it is illustrated that the second polarizing layer Pol2 is arranged between the color realizing layer CRL and the second driving layer DDL2. However, the present inventive concept is not limited thereto. For example, the second polarizing layer Pol2 may be arranged on an external surface of the second base substrate SUB2, that is, a surface on which the second driving layer DDL2 is not provided among both surfaces of the second base substrate SUB2.

The second driving layer DDL2 may be arranged on the second polarizing layer Pol2. The second driving layer DDL2 may include a common electrode CE that forms an electric field with the pixel electrode. Here, the common electrode CE may form a vertical electric field with the pixel electrode. On the other hand, the second driving layer DDL2 may be integrated with the first driving layer DDL1. When the second driving layer DDL2 is integrated with the first driving layer DDL1, the pixel electrode and the common electrode CE may form a horizontal electric field.

The liquid crystal layer LCL may be arranged between the first substrate 110 and the second substrate 120. The liquid crystal molecules of the liquid crystal layer LCL are arranged in a specific direction by the electric field formed by the pixel electrode and the common electrode CE and may control transmittance of light. Therefore, the liquid crystal layer LCL transmits light provided by the backlight unit 200 so that the LCD panel 100 may realize an image.

The backlight unit 200 is arranged outside the display panel 100 and may provide light to the liquid crystal layer LCL. The backlight unit 200 may include a light guide plate (not shown), a light source (not shown) including a plurality of light emitting diodes, an optical member (not shown), and a reflective sheet (not shown).

The light guide plate may be arranged under the display panel 100. The light guide plate guides the light emitted by the light source and may emit the light in a direction of the display panel 100. In particular, the light guide plate may overlap at least the display area DA of the display panel 100.

The light source may supply light to one side surface of the light guide plate or a lower surface of the light guide plate. For example, when the backlight unit 200 is the direct type backlight unit, the light source may supply light to the lower surface of the light guide plate or, when the backlight unit 200 is the edge type backlight unit, the light source may supply light to the one side surface of the light guide plate. In the light source, the plurality of light emitting diodes may be mounted on a printed circuit board (PCB). Here, the light emitting diodes may emit light components of the same color. For example, the light emitting diodes may emit blue light components.

The optical member may be arranged between the light guide plate and the display panel. The optical member is provided in the light source and may control light emitted by the light guide plate. In addition, the optical member may include a diffusion sheet (not shown), a prism sheet (not shown), and a protective sheet (not shown) that are sequentially stacked.

The diffusion sheet may diffuse the light emitted from the light guide plate. The prism sheet may concentrate light diffused into the diffusion sheet in a direction vertical to a plane of the display panel 100. Therefore, most of light that passes through the prism sheet may be vertically incident on the display panel 100. The protective sheet may be arranged on the prism sheet. The protective sheet may protect the prism sheet against external shock.

According to the current embodiment, it is illustrated that the optical member 230 includes the diffusion sheet, the prism sheet, and the protective sheet by one piece. However, the present inventive concept is not limited thereto. In the optical member 230, at least one of the diffusion sheet, the prism sheet, and the protective sheet may be plural and may be overlapped to be used and one of the above sheets may be omitted as occasion demands.

The reflective sheet (not shown) may be arranged between the light guide plate and a lower cover. The reflective sheet reflects light that leaks without being provided in the direction of the display panel 100 in the light emitted by the light source and may change a path of the light into the direction of the display panel 100. The reflective sheet may include a material that reflects light. Therefore, the reflective sheet may increase an amount of light provided to the display panel 100.

Figure 5:
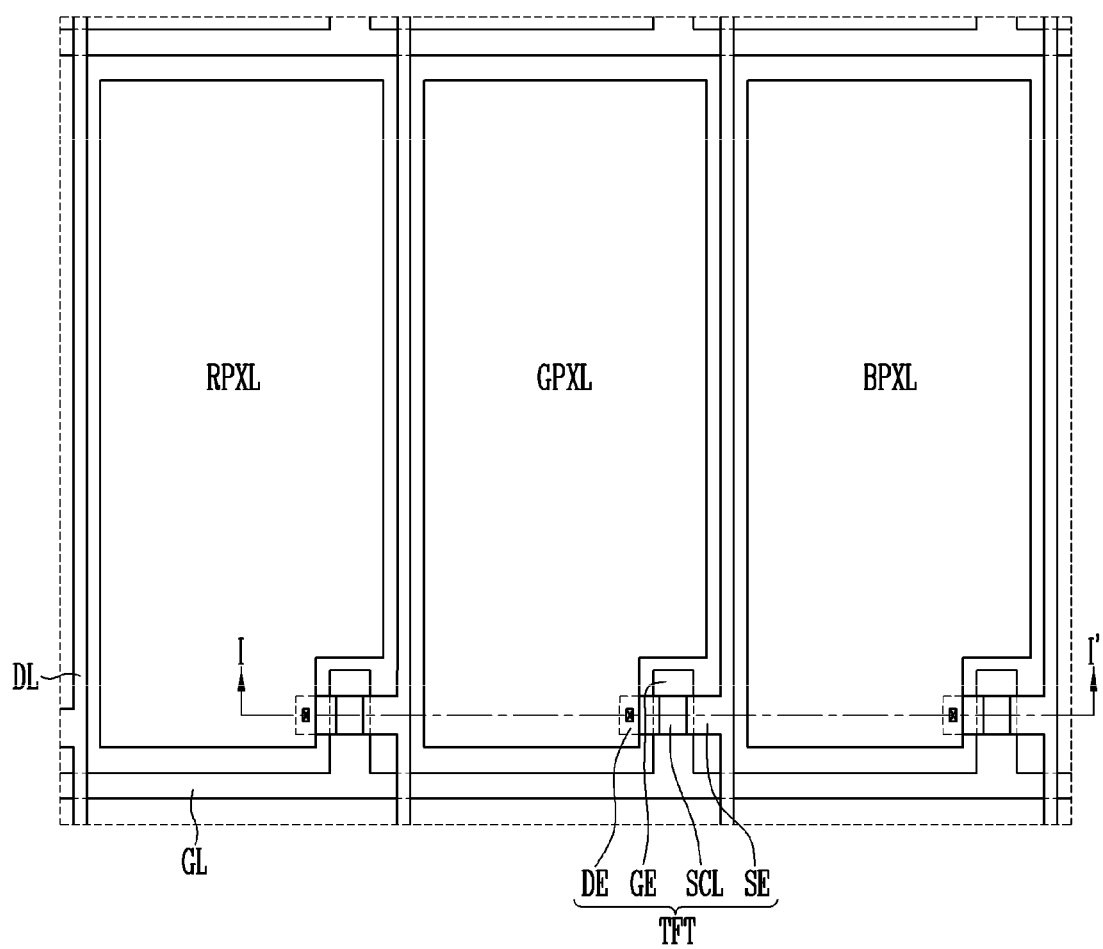
FIG. 5 is a plan view illustrating RGB pixels of the display panel of FIGS. 1 through 3 and 4A and 4B.

FIG. 5 is a plan view illustrating RGB pixels of the display panel 100 of FIGS. 1 through 3 and 4A and 4B.

Figure 6A:
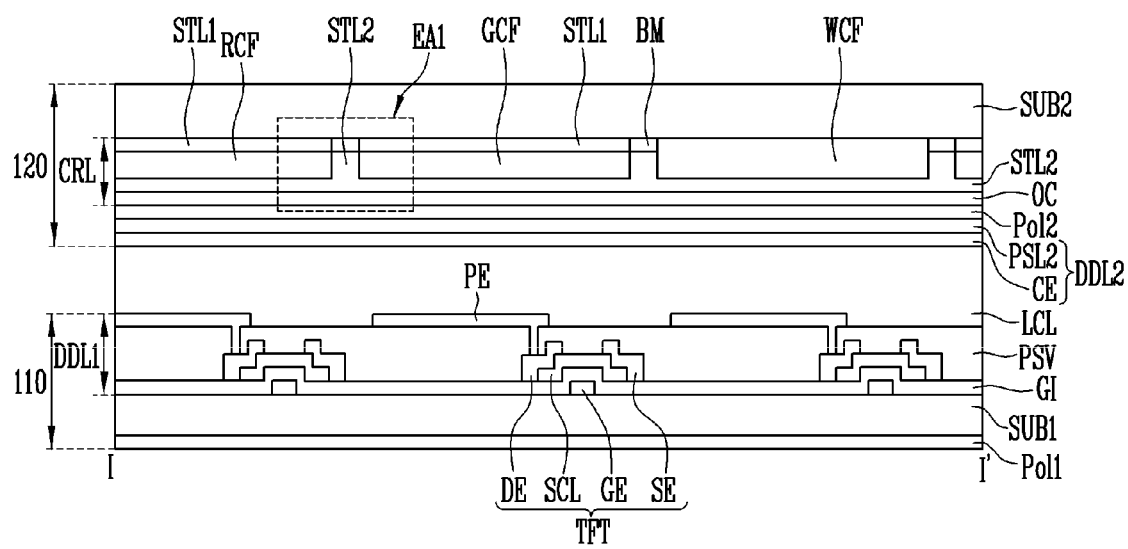
FIGS. 6A, 6B, and 6C are cross-sectional views taken along the line I-I' of FIG. 5.
Figure 6B:
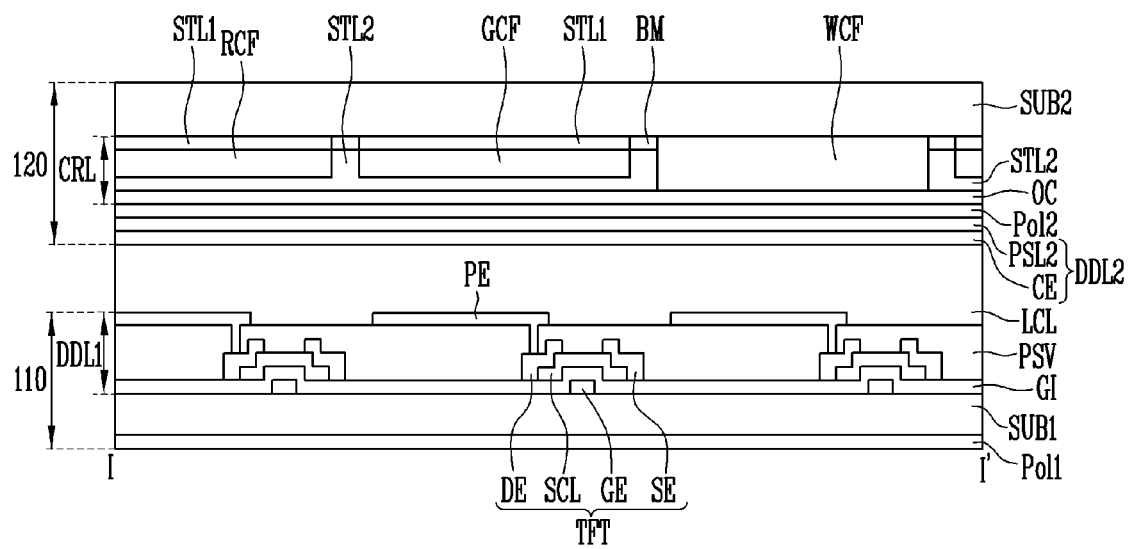
Figure 6C:
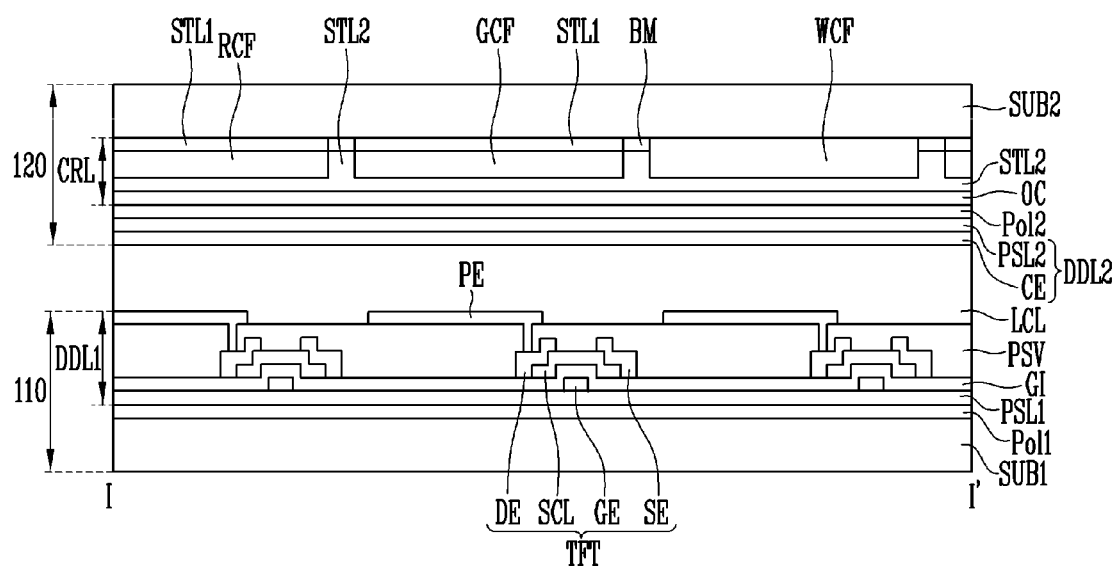
Figure 7:
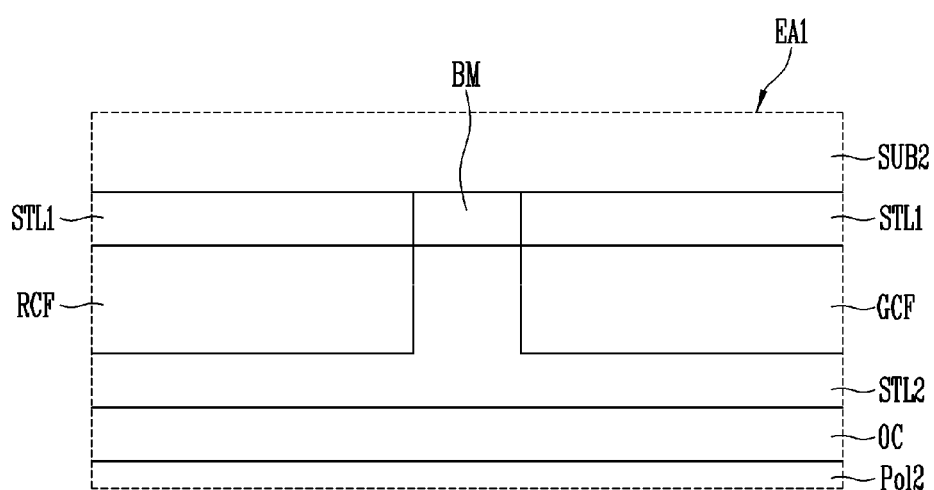
FIG. 7 is an enlarged view of the area EA1 of FIG. 6A.

FIGS. 6A, 6B, and 6C are cross-sectional views taken along the line I-I' of FIG. 5. FIG. 7 is an enlarged view of the area EA1 of FIG. 6A.

Referring to FIGS. 5, 6A, 6B, 6C, and 7, the display panel 100 may include a red pixel RPXL, a green pixel GPXL, and a blue pixel BPXL. In addition, the display panel 100 may include the first substrate 110, the second substrate 120, and the liquid crystal layer LCL.

The first substrate 110 may include the first base substrate SUB1, the first driving layer DDL1 arranged on the first base substrate SUB1, and the first polarizing layer Pol1.

The first polarizing layer Pol1 polarizes the light provided by the backlight unit (refer to "200" of FIGS. 3A, 3B, 4A, and 4B) in a specific direction and may provide the polarized light to the liquid crystal layer LCL. The first polarizing layer Pol1 may be arranged between the first base substrate SUB1 and the backlight unit 200. In addition, the first polarizing layer Pol1 may be arranged between the first base substrate SUB1 and the first driving layer DDL1. When the first polarizing layer Pol1 is arranged between the first base substrate SUB1 and the first driving layer DDL1, the first polarizing layer Pol1 may include the WGP. When the first polarizing layer Pol1 is arranged between the first base substrate SUB1 and the first driving layer DDL1, the first substrate 110 may include a first passivation layer (not shown) arranged between the first polarizing layer Pol1 and the first driving layer DDL1. The first passivation layer PSL1 may insulate the first polarizing layer Pol1 and the first driving layer DDL1 from each other. Hereinafter, for convenience sake, the first polarizing layer Pol1 is illustrated as being arranged between the first base substrate SUB1 and the backlight unit 200.

In each of the pixels RPXL, GPXL, and BPXL, the first driving layer DDL1 may include at least one TFT provided on the first base substrate SUB1 and a pixel electrode PE connected to the TFT.

The TFT may include a gate electrode GE, a semiconductor layer SCL, a source electrode SE, and a drain electrode DE.

Hereinafter, the TFT will be described in detail.

The gate electrode GE may be arranged on the first base substrate SUB1. The gate electrode GE may be connected to the gate line GL. For example, a part of the gate line GL may protrude and may form the gate electrode GE. In addition, an insulating layer (not shown) may be arranged between the gate electrode GE and the first base substrate SUB1.

A gate insulating layer GI that covers the gate electrode GE may be arranged on the gate electrode GE. The gate insulating layer GI may include at least one of an organic insulating material and an inorganic insulating material. For example, the gate insulating layer GI may include at least one of a silicon oxide and a silicon nitride.

The semiconductor layer SCL may be arranged on the gate insulating layer GI. In addition, at least a part of the semiconductor layer SCL may overlap the gate electrode GE. The semiconductor layer SCL may include one among amorphous silicon a-Si, polycrystalline silicon p-Si, and an oxide semiconductor. In addition, in the semiconductor layer SCL, areas connected to the source electrode SE and the drain electrode DE may be a source area and a drain area that are doped with impurities by depositing a impurity doped layer on a non-doped semiconductor layer or implanting impurities into the non-doped semiconductor layer. An area between the source area and the drain area may be a channel area. Here, the oxide semiconductor may include at least one among zinc (Zn), indium (In), gallium (Ga), tin (Sn), and a mixture of the above metals. For example, the oxide semiconductor may include indium-gallium-zinc oxide (IGZO).

One end of the source electrode SE may be connected to the data line DL that intersects the gate line GL. For example, a part of the data line DL may protrude and may form the source electrode SE. The other end of the source electrode SE may be connected to one end of the semiconductor layer SCL, for example, the source area.

The drain electrode DE may be arranged to be spaced apart from the source electrode SE. One end of the drain electrode DE may be connected to the other end of the semiconductor layer SCL, for example, the drain area and the other end of the drain electrode DE may be connected to the pixel electrode PE.

On the other hand, in the above, a TFT of a bottom gate structure in which the gate electrode GE of the TFT is disposed under the semiconductor layer SCL is illustrated. However, the present inventive concept is not limited thereto. For example, the TFT may have a top gate structure in which the gate electrode GE is disposed on the semiconductor layer SCL.

The first substrate 110 may further include a protective layer PSV arranged on the TFT. The protective layer PSV covers the TFT and may expose the other end of the drain electrode DE.

The protective layer PSV may include at least one of an inorganic protective layer and an organic protective layer. For example, the protective layer PSV may include the inorganic protective layer that covers the TFT and the organic protective layer arranged on the inorganic protective layer. The inorganic protective layer may include at least one of the silicon oxide and the silicon nitride. For example, the inorganic protective layer may cover the TFT. The organic protective layer may include an organic insulating material that may transmit light. For example, the organic protective layer may include at least one among polyacrylates resin, epoxy resin, phenolic resin, polyamides resin, polyimides resin, unsaturated polyesters resin, polyphenylene ethers resin, polyphenylene sulfides resin, and benzocyclobutene resin.

The pixel electrode PE may be arranged on the protective layer PSV. The pixel electrode PE may be connected to the other end of the drain electrode DE. The pixel electrode PE may include a transparent conductive oxide. For example, the pixel electrode PE may include at least one among indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO).

On the other hand, although not shown in the drawings, the pixel electrode PE may include a plurality of slits in order to precisely control liquid crystal molecules included in the liquid crystal layer LCL.

The second substrate 120 may face the first substrate 110. The second substrate 120 may include the second base substrate SUB2, the color realizing layer CRL arranged on the second substrate 120, the second polarizing layer Pol2 arranged on the color realizing layer CRL, and the second driving layer DDL2 arranged on the second polarizing layer Pol2.

The second base substrate SUB2 may include the same material as the first base substrate SUB1.

The color realizing layer CRL may be arranged on one surface of the second base substrate SUB2, for example, a surface that faces the first substrate 110. The color realizing layer CRL may include light blocking patterns BM arranged in areas between adjacent pixels on the second base substrate SUB2, first selective transmission layers STL1 arranged on the second base substrate SUB2 to correspond to the red pixel RPXL and the green pixel GPXL, a first color filter RCF and a second color filter GCF arranged on the first selective transmission layers STL1, a third color filter WCF arranged on the second base substrate SUB2 to correspond to the blue pixel BPXL, a second selective transmission layer STL2 that covers at least the first color filter RCF and the second color filter GCF, and a planarization layer OC arranged on the second selective transmission layer STL2.

The light blocking patterns BM may expose areas corresponding to the red pixel RPXL, the green pixel GPXL, and the blue pixel BPXL of the second base substrate SUB2, for example, a red pixel area, a green pixel area, and a blue pixel area. The light blocking patterns BM provided in the backlight unit 200 may prevent light components that pass through the liquid crystal layer LCL and the color filters RCF, GCF, and WCF from being mixed in different pixels and may prevent color reproducibility from deteriorating. In addition, the light blocking patterns BM may prevent external light from being incident on the display panel 100 and being reflected.

The first selective transmission layers STL1 block the blue light among the light components that pass through the first color filter RCF and the second color filter GCF and may transmit the other light components since the light source of the backlight unit 200 is a light emitting diode that emits the blue light. Therefore, the first selective transmission layers STL1 may improve the color reproducibility of the display panel 100.

The first color filter RCF and the second color filter GCF may include an organic material and a quantum dot material dispersed into the organic material. The quantum dot material included in the first color filter RCF absorbs the blue light and may convert the absorbed blue light into red light. The quantum dot material included in the second color filter GCF absorbs the blue light and may convert the absorbed blue light into green light. Therefore, the first color filter RCF and the second color filter GCF may convert the blue light provided from the backlight unit 200 into the red light and the green light.

The third color filter WCF may transmit the blue light provided by the backlight unit 200. For example, the third color filter WCF may be a transparent, blue, or white color filter.

The second selective transmission layer STL2 may cover at least the first color filter RCF and the second color filter GCF. For example, as illustrated in FIG. 6B, the second selective transmission layer STL2 may cover the first color filter RCF and the second color filter GCF. In addition, as illustrated in FIGS. 6A and 6C, the second selective transmission layer STL2 may cover the first color filter RCF, the second color filter GCF, and the third color filter WCF.

The second selective transmission layer STL2 reflects the yellow light and may transmit the other light components. Since the yellow light is a mixture of the red light and the green light, the second selective transmission layer STL2 may reflect the red light and the green light converted by the first color filter RCF and the second color filter GCF. In addition, the second selective transmission layer STL2 may reflect the light components excluding the blue light among the light components incident on the third color filter WCF. Therefore, the second selective transmission layer STL2 may improve the color reproducibility of the display panel 100.

The planarization layer OC may include a transparent organic material. As illustrated in FIG. 6B, the planarization layer OC may cover the second selective transmission layer STL2 and the third color filter WCF. Therefore, the planarization layer OC may planarize surfaces of the second selective transmission layer STL2 and the third color filter WCF. In addition, as illustrated in FIGS. 6A and 6C, the planarization layer OC may cover the second selective transmission layer STL2. Therefore, the planarization layer OC may planarize a surface of the second selective transmission layer STL2.

The second polarizing layer Pol2 is arranged on the color realizing layer CRL and may selectively transmit or block the light that passes through the liquid crystal layer LCL. The second polarizing layer Pol2 may include the WGP like the first polarizing layer Pol1.

The second driving layer DDL2 may include a second passivation layer PSL2 arranged on the second polarizing layer Pol2 and the common electrode CE arranged on the second passivation layer PSL2.

The second passivation layer PSL2 may insulate the second polarizing layer Pol2 and the common electrode CE from each other. In addition, the second passivation layer PSL2 may planarize a surface of the second polarizing layer Pol2.

The common electrode CE may form an electric field with the pixel electrode PE. The common electrode CE may include a transparent conductive oxide. For example, the common electrode CE may include the same material as the pixel electrode PE.

Figure 8:
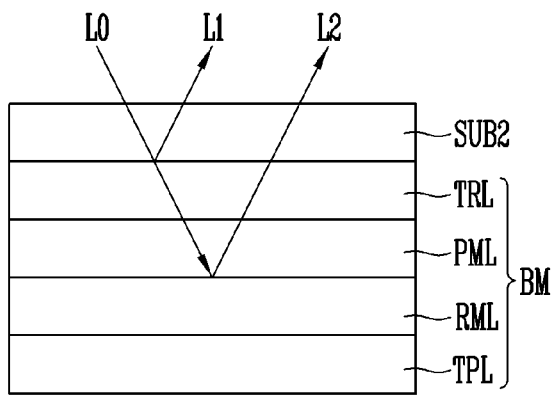
FIG. 8 is a cross-sectional view illustrating the light blocking pattern of FIGS. 6A, 6B, and 6C.

FIG. 8 is a cross-sectional view illustrating the light blocking pattern of FIGS. 6A, 6B, and 6C.

Referring to FIG. 8, the light blocking pattern BM may be provided on a surface of the second base substrate SUB2.

The light blocking pattern BM may include a semi-transmission reflective layer TRL arranged on the second base substrate SUB2, a phase matching layer PML arranged on the semi-transmission reflective layer TRL, a reflective metal layer RML arranged on the phase matching layer PML, and a transmission protective layer TPL arranged on the reflective metal layer RML.

The semi-transmission reflective layer TRL reflects a part of external light $L_O$ and may transmit the rest of the external light $L_O$. The semi-transmission reflective layer TRL may include a material with a high optical absorption coefficient. For example, the semi-transmission reflective layer TRL may include at least one of titanium (Ti), molybdenum (Mo), and an alloy of the above metals. When the optical absorption coefficient of the semi-transmission reflective layer TRL is high, reflectance of the external light may be reduced by the semi-transmission reflective layer TRL. Therefore, the semi-transmission reflective layer TRL may suppress increase in the reflectance of the external light of the light blocking pattern BM.

The semi-transmission reflective layer TRL may have a thickness of several ten Å through several hundred Å so as to transmit light. For example, the thickness of the semi-transmission reflective layer TRL may have a thickness of no more than about 150 Å. When the thickness of the semi-transmission reflective layer TRL is larger than 150 Å, reflectance of the semi-transmission reflective layer TRL may increase.

The phase matching layer PML may be optically transparent. Here, the phase matching layer PML is optically transparent means that the phase matching layer PML transmits visible rays of no less than about 50%, for example, 80%. The phase matching layer PML may include a transparent metal oxide. The transparent metal oxide may include at least one among ITO, IZO, AZO, GZO, ZTO, GTO, and FTO. In addition, the phase matching layer PML may include a transparent organic material. The conductive organic material may include at least one among polypyrrole, polythiophene, poly acetylene, PEDOT:PSS (poly(3,4-ethylenedioxythiophene) polystyrene sulfonate), and polyaniline.

A thickness of the phase matching layer PML may be controlled so that light $L_1$ reflected by the semi-transmission reflective layer TRL and light $L_2$ reflected by the reflective metal layer RML may cause destructive interference and may be several ten Å through several hundred A. For example, the thickness of the phase matching layer PML may be 400 Å through 750 Å.

The reflective metal layer RML may reflect light that passes through the semi-transmission reflective layer TRL and the phase matching layer PML in the external light $L_O$.

The reflective metal layer RML may include a material with high optical reflectivity. For example, the reflective metal layer RML may include one of silver (Ag), an Ag alloy, aluminum (Al), and an Al alloy.

The reflective metal layer RML may have a thickness at which the light that passes through the semi-transmission reflective layer TRL and the phase matching layer PML in the external light $L_O$ may be reflected. For example, the reflective metal layer RML may have a thickness of about 300 Å through 4,000 Å.

The transmission protective layer TPL is arranged on the reflective metal layer RML and may prevent the reflective metal layer RML from being oxidized. The transmission protective layer TPL may transmit light and may include the same material as the phase matching layer PML. For example, the transmission protective layer TPL may include at least one among ITO, IZO, AZO, GZO, ZTO, GTO, and FTO.

On the other hand, the phase matching layer PML, the reflective metal layer RML, and the transmission protective layer TPL may include materials having substantially the same etching rate. For example, when the phase matching layer PML and the transmission protective layer TPL include IZO, the reflective metal layer RML may include an alloy of Al-nickel (Ni)-lanthanum (La).

Hereinafter, it will be described that how the light blocking pattern BM may prevent the external light $L_O$ from being reflected.

The external light $L_O$ may be incident on the light blocking pattern BM through the second base substrate SUB2. The external light $L_O$ passes through the second base substrate SUB2 and a part of the external light $L_O$ may be reflected from the semi-transmission reflective layer TRL. Hereinafter, the light reflected from the semi-transmission reflective layer TRL is referred to as the first reflected light $L_1$.

On the other hand, the rest of the external light $L_O$ may be incident on the reflective metal layer RML via the semi-transmission reflective layer TRL and the phase matching layer PML. The external light $L_O$ passes through the phase matching layer PML and is reflected from the reflective metal layer RML so that a phase of the external light $L_O$ may change. Hereinafter, the light reflected from the reflective metal layer RML is referred to as the second reflected light $L_2$.

A part of the second reflected light $L_2$ may be reflected again from the semi-transmission reflective layer TRL. That is, a part of the second reflected light $L_2$ may be repeatedly reflected between the semi-transmission reflective layer TRL and the reflective metal layer RML. Since a phase of the light repeatedly reflected between the semi-transmission reflective layer TRL and the reflective metal layer RML changes due to the phase matching layer PML, a destructive interference condition is satisfied so that the light repeatedly reflected between the semi-transmission reflective layer TRL and the reflective metal layer RML may be destructed. In addition, the rest of the second reflected light $L_2$ transmits the semi-transmission reflective layer TRL, may cause destructive interference with the first reflected light $L_1$, and may be destructed. Therefore, the external light $L_0$ incident on the light blocking pattern BM is divided into the first reflected light $L_1$ reflected from the semi-transmission reflective layer TRL and the second reflected light $L_2$ reflected from the reflective metal layer RML and the first reflected light $L_1$ and the second reflected light $L_2$ may be destructed by the destructive interference condition.

Figure 9:
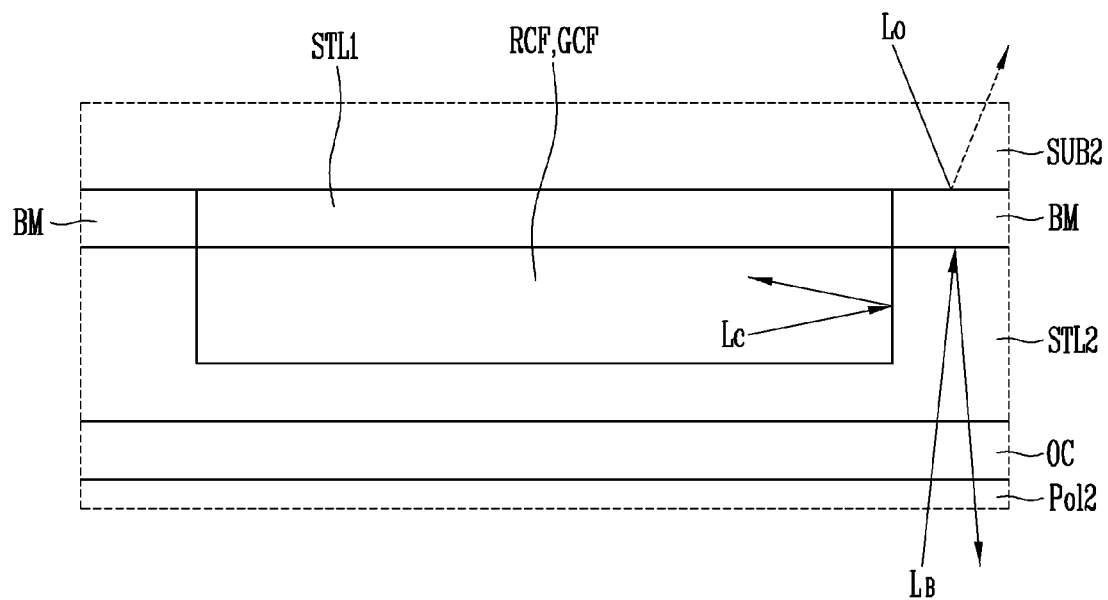
FIG. 9 is a partial cross-sectional view illustrating the color realizing layer of FIGS. 6A, 6B, and 6C.

FIG. 9 is a partial cross-sectional view illustrating the color realizing layer of FIGS. 6A, 6B, and 6C.

Referring to FIGS. 8 and 9, the color realizing layer (refer to "CRL" of FIGS. 6A, 6B, and 6C) may be arranged on one surface of the second base substrate SUB2. The color realizing layer CRL may include the light blocking pattern BM, the first selective transmission layer STL1, the color filter RCF or GCF, the second selective transmission layer STL2, and the planarization layer OC.

The light blocking pattern BM may expose a part of the second base substrate SUB2 and the first selective transmission layer STL1 may be arranged on the exposed surface of the second base substrate SUB2. The color filter RCF or GCF may be arranged on the first selective transmission layer STL1 and the second selective transmission layer STL2 may cover the color filter RCF or GCF. The planarization layer OC may planarize the surface of the second selective transmission layer STL2.

On the other hand, the color filter RCF or GCF may include the organic material and the quantum dot material dispersed into the organic material. For example, the quantum dot material absorbs blue light $L_B$ provided by the backlight unit (refer to "200" of FIGS. 3A, 3B, 4A, and 4B) and may converted the blue light $L_B$ into converted light $L_C$ that is red light or green light.

The converted light $L_C$ is not emitted in a specific direction but may be emitted in all directions from the quantum dot material. Therefore, the converted light $L_C$ emitted from the color filter RCF or GCF including the quantum dot material may be emitted not only in a direction of the second base substrate SUB2 but also in a direction of a side surface of the color filter RCF or GCF and a direction opposite to the direction of the second base substrate SUB2.

The converted light $L_C$ emitted in the direction of the side surface of the color filter RCF and GCF and the direction opposite to the direction of the second base substrate SUB2 may be reflected from the second selective transmission layer STL2. Since the second selective transmission layer STL2 reflects the yellow light and may transmit the other light components, the second selective transmission layer STL2 transmits the blue light $L_B$ provided by the backlight unit 200 and may reflect the converted light $L_C$. Therefore, most of the converted light $L_C$ may be emitted to the outside through the first selective transmission layer STL1 and the color filter RCF or GCF including the quantum dot material may improve light efficiency of the display device.

On the other hand, light that is not provided to the color filter RCF or GCF in the blue light $L_B$ provided by the backlight unit 200 may be reflected from the light blocking pattern BM, in particular, the reflective metal layer RML of the light blocking pattern BM. The blue light $L_B$ reflected from the light blocking pattern BM may be reflected from the second polarizing layer Pol2 below the light blocking pattern BM. The blue light $L_B$ is reflected between the light blocking pattern BM and the second polarizing layer Pol2 and may be incident on the color filter RCF or GCF. Therefore, the light efficiency of the display device may improve.

In addition, in the external light $L_0$ incident from the outside of the second base substrate SUB2, the light incident on the color filter RCF or GCF passes through the liquid crystal layer (refer to "LCL" of FIGS. 3A, 3B, 4A, and 4B) below the color filter RCF or GCF and may be destructed. In addition, in the external light $L_0$ incident from the outside of the second base substrate SUB2, the light incident on the light blocking pattern BM may be destructed by the destructive interference condition.

Hereinafter, a method of manufacturing the display panel of FIGS. 1 through 9 will be described with reference to FIGS. 10 through 17.

FIGS. 10 through 17 are cross-sectional views illustrating processes of a method of manufacturing a display panel according to an embodiment of the present inventive concept. In FIGS. 10 through 17, for convenience sake, it is illustrated that the first polarizing layer is arranged on the external surface of the first base substrate and the second selective transmission layer covers the first color filter, the second color filter, and the third color filter. In addition, in FIGS. 11 and 12, for convenience sake, the light blocking pattern is conceptually illustrated.

Figure 10:
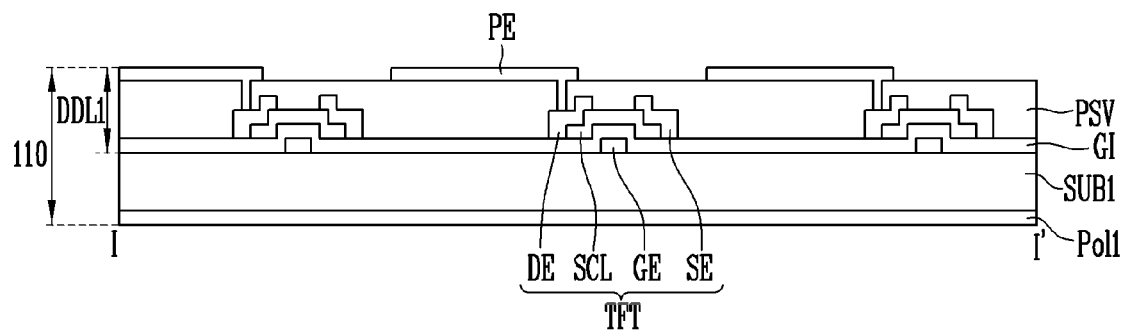
FIGS. 10, 11, 12, 13, 14, 15, 16 and 17 are cross-sectional views illustrating processes of a method of manufacturing a display panel according to an embodiment of the present inventive concept.

Referring to FIG. 10, the first substrate 110 is provided. The first substrate 110 includes the first base substrate SUB1, the first polarizing layer Pol1 arranged on one surface of the first base substrate SUB1, and the first driving layer DDL1 arranged on the other surface of the first base substrate SUB1.

The first driving layer DDL1 may include at least one TFT provided on the first base substrate SUB1 and the pixel electrode PE connected to the TFT. The first driving layer DDL1 may be manufactured by forming the TFT on the first base substrate SUB1 and forming the pixel electrode PE connected to the TFT.

Hereinafter, a method of manufacturing the first driving layer DDL1 will be described in more detail.

First, the TFT is formed on one surface of the first base substrate SUB1. The TFT may include the gate electrode GE, the semiconductor layer SCL, the source electrode SE, and the drain electrode DE.

The TFT may be formed as follows.

First, the gate electrode GE is formed by depositing a conductive material on one surface of the first base substrate SUB1 and performing patterning.

After forming the gate electrode GE, the gate insulating layer GI that covers the gate electrode GE is formed. The gate insulating layer GI may include at least one of the organic insulating material and the inorganic insulating material. For example, the gate insulating layer GI may include at least one of the silicon oxide and the silicon nitride.

After forming the gate insulating layer GI, the semiconductor layer SCL is formed by depositing a semiconductor material on the gate insulating layer GI and performing patterning. In the semiconductor layer SCL, areas connected to the source electrode SE and the drain electrode DE may be the source area and the drain area that are doped with impurities by depositing a impurity doped layer on a non-doped semiconductor layer or implanting impurities into the non-doped semiconductor layer. The area between the source area and the drain area may be the channel area.

After forming the semiconductor layer SCL, the source electrode SE and the drain electrode DE may be formed by depositing a conductive material on the semiconductor layer SCL and performing patterning.

After forming the TFT, the protective layer PSV that covers the TFT is formed. The protective layer PSV may include at least one of the inorganic protective layer and the organic protective layer. For example, the protective layer PSV may include the inorganic protective layer that covers the TFT and the organic protective layer arranged on the inorganic protective layer.

After forming the protective layer PSV, a part of the drain electrode DE is exposed by patterning the protective layer PSV.

After patterning the protective layer PSV, the pixel electrode PE connected to the drain electrode DE is formed on the protective layer PSV. The pixel electrode PE may include the transparent conductive oxide. For example, the pixel electrode PE may include at least one among ITO, IZO, AZO, GZO, ZTO, GTO, and FTO. The pixel electrode PE may include the plurality of slits in order to precisely control the liquid crystal molecules included in the liquid crystal layer LCL.

After forming the pixel electrode PE, the first polarizing layer Pol1 is formed on the other surface of the first base substrate SUB1.

Referring to FIGS. 11 through 15, after providing the first substrate 110, the second substrate 120 is provided. The second substrate 120 may be manufactured by sequentially forming the color realizing layer CRL arranged on the second base substrate SUB2, the second polarizing layer Pol2 arranged on the color realizing layer CRL, and the second driving layer DDL2 arranged on the second polarizing layer Pol2.

The color realizing layer CRL may be arranged on one surface of the second base substrate SUB2, for example, the surface that faces the first substrate 110. The color realizing layer CRL may include the light blocking patterns BM surrounding the pixels on the second base substrate SUB2, the first selective transmission layers STL1 arranged on the second base substrate SUB2 to correspond to the red pixel RPXL and the green pixel GPXL, the first color filter RCF and the second color filter GCF arranged on the first selective transmission layers STL1, the third color filter WCF arranged on the second base substrate SUB2 to correspond to the blue pixel BPXL, the second selective transmission layer STL2 that covers the first color filter RCF and the second color filter GCF, and the planarization layer OC arranged on the second selective transmission layer STL2 and the third color filter WCF.

Hereinafter, referring to FIGS. 11 through 15, a method of manufacturing the color realizing layer CRL will be described in more detail.

Figure 11:
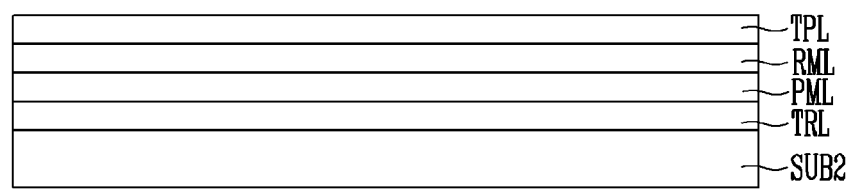

First, as illustrated in FIG. 11, the semi-transmission reflective layer TRL, the phase matching layer PML arranged on the semi-transmission reflective layer TRL, the reflective metal layer RML arranged on the phase matching layer PML, and the transmission protective layer TPL arranged on the reflective metal layer RML are sequentially formed on the second base substrate SUB2.

The semi-transmission reflective layer TRL may include the material with the high optical absorption coefficient. For example, the semi-transmission reflective layer TRL may include at least one of Ti, Mo, and an alloy of the above metals. The semi-transmission reflective layer TRL may have a thickness of several ten Å through several hundred Å so as to transmit light. For example, the thickness of the semi-transmission reflective layer TRL may have a thickness of no more than about 150 Å.

The phase matching layer PML may include one of the transparent metal oxide and the transparent organic material. The transparent metal oxide may include at least one among ITO, IZO, AZO, GZO, ZTO, GTO, and FTO. The conductive organic material may include at least one among polypyrrole, polythiophene, polyacetylene, PEDOT:PSS(poly(3, 4-ethylenedioxythiophene) polystyrene sulfonate), and polyaniline.

A thickness of the phase matching layer PML may be controlled so that the light $L_1$ reflected by the semi-transmission reflective layer TRL and the light $L_2$ reflected by the reflective metal layer RML may cause destructive interference and may be several ten Å through several hundred Å. For example, the thickness of the phase matching layer PML may be 400 Å through 750 Å.

The reflective metal layer RML may include a material with high optical reflectivity. For example, the reflective metal layer RML may include one of Ag, an Ag alloy, Al, and an Al alloy.

The reflective metal layer RML may have a thickness at which the light that passes through the semi-transmission reflective layer TRL and the phase matching layer PML in the external light $L_0$ may be reflected. For example, the reflective metal layer RML may have a thickness of about 300 Å through 4,000 Å.

The transmission protective layer TPL is arranged on the reflective metal layer RML and may prevent the reflective metal layer RML from being oxidized. The transmission protective layer TPL may include the same material as the phase matching layer PML. For example, the transmission protective layer TPL may include at least one among ITO, IZO, AZO, GZO, ZTO, GTO, and FTO.

On the other hand, the phase matching layer PML, the reflective metal layer RML, and the transmission protective layer TPL may have substantially the same etching rate with respect to wet etching. For example, when the phase matching layer PML and the transmission protective layer TPL include IZO, the reflective metal layer RML may include an alloy of Al—Ni—La so that an etch profile of the light blocking pattern BM obtained by etching the light blocking pattern BM is uniform.

Figure 12:
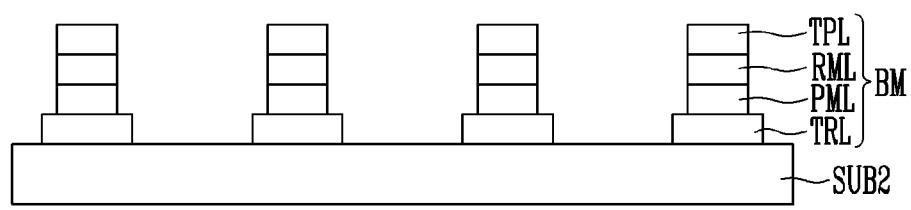

As illustrated in FIG. 12, the light blocking pattern BM that exposes a part of the second base substrate SUB2 is formed by etching the semi-transmission reflective layer TRL, the phase matching layer PML, the reflective metal layer RML, and the transmission protective layer TPL at one time. Here, the etching may be performed by using a wet etching process. In addition, the light blocking pattern BM may expose areas corresponding to the red pixel (refer to "RPXL" of FIG. 5), the green pixel (refer to "GPXL" of FIG. 5), and the blue pixel (refer to "BPXL" of FIG. 5) of the second base substrate SUB2.

On the other hand, since the etching rates of the phase matching layer PML, the reflective metal layer RML, and the transmission protective layer TPL with respect to the wet etching are substantially the same, it is possible to prevent the phase matching layer PML and the transmission protective layer TPL from being excessively etched in comparison with the reflective metal layer RML. That is, it is possible to prevent under-cut from being generated in the phase matching layer PML due to a difference in etching rate between the phase matching layer PML and the reflective metal layer RML. Therefore, the etch profiles of the phase matching layer PML, the reflective metal layer RML, and the transmission protective layer TPL may be uniform.

In addition, since the etching rates of the phase matching layer PML, the reflective metal layer RML, and the transmission protective layer TPL with respect to the wet etching are substantially the same, it is possible to prevent the reflective metal layer RML from being excessively etched in comparison with the phase matching layer PML and the transmission protective layer TPL. That is, it is possible to prevent under-cut from being generated in the reflective metal layer RML due to a difference in etching rate among the phase matching layer PML, the reflective metal layer RML, and the transmission protective layer TPL. Therefore, the etch profiles of the phase matching layer PML, the reflective metal layer RML, and the transmission protective layer TPL may be uniform.

TABLE 1

| | BM (TRL/PML/RML/TPL) | Under cut in a phase matching layer |
|---|---|---|
| Experimental example 1 | Ti 120 Å/IZO 450 Å/Ag 1000 Å/IZO 70 Å | ○ |
| Experimental example 2 | Ti 120 Å/IZO 450 Å/Al—Ni—La alloy 1000 Å/IZO 70 Å | X |
| Experimental example 3 | Ti 100Å/IZO 450 Å/Al—Ni—La alloy 1000 Å/ITO 70 Å | ○ |
| Experimental example 4 | Ti 100 Å/IZTO 400 Å/Ag 1000 Å/ITO 70 Å | ○ |
| Experimental example 5 | Ti 100 Å/IZTO 400 Å/Ag 1000 Å/ITO 70 Å | ○ |

In the TABLE 1, in the light blocking pattern BM of the experimental example 1, the semi-transmission reflective layer TRL includes Ti of 120 Å, the phase matching layer PML includes IZO of 450 Å, the reflective metal layer RML includes Ag of 1,000 Å, and the transmission protective layer TPL includes IZO of 70 Å. In the light blocking pattern BM of the experimental example 2, the semi-transmission reflective layer TRL includes Ti of 120 Å, the phase matching layer PML includes IZO of 450 Å, the reflective metal layer RML includes an Al—Ni—La alloy (ANL) of 1,000 Å, and the transmission protective layer TPL includes IZO of 70 Å. In the light blocking pattern BM of the experimental example 3, the semi-transmission reflective layer TRL includes Ti of 100 Å, the phase matching layer PML includes ITO of 450 Å, the reflective metal layer RML includes ANL of 1,000 Å, and the transmission protective layer TPL includes ITO of 70 Å. In the light blocking pattern BM of the experimental example 4, the semi-transmission reflective layer TRL includes Ti of 100 Å, the phase matching layer PML includes IZTO (including In of 20 wt %) of 400 Å, the reflective metal layer RML includes Ag of 1,000 Å, and the transmission protective layer TPL includes ITO of 70 Å. In the light blocking pattern BM of the experimental example 5, the semi-transmission reflective layer TRL includes Ti of 100 Å, the phase matching layer PML includes IZTO (including In of 90 wt %) of 400 Å, the reflective metal layer RML includes Ag of 1,000 Å, and the transmission protective layer TPL includes ITO of 70 Å.

Referring to the TABLE 1, in the experimental examples 1, 3, 4, and 5, under-cut is generated in the phase matching layer PML due to a difference between the etching rates of the phase matching layer PML and the transmission protective layer TPL and the reflective metal layer RML.

On the other hand, in the experimental example 2, under-cut is not generated in the phase matching layer PML since the etching rates of the phase matching layer PML and the transmission protective layer TPL and the etching rate of the reflective metal layer RML are substantially the same.

Therefore, in order to have the etch profile of the light blocking pattern BM uniform, the etching rates of the phase matching layer PML and the transmission protective layer TPL and the etching rate of the reflective metal layer RML should be substantially the same.

Figure 13:
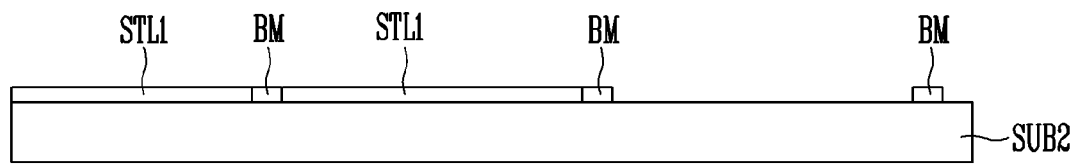

As illustrated in FIG. 13, after forming the light blocking patterns BM, the first selective transmission layers STL1 are formed on exposed surfaces of the areas corresponding to the red pixel RPXL and the green pixel GPXL of the second base substrate SUB2. The first selective transmission layers STL1 block the blue light and may transmit the light components excluding the blue light.

Figure 14:
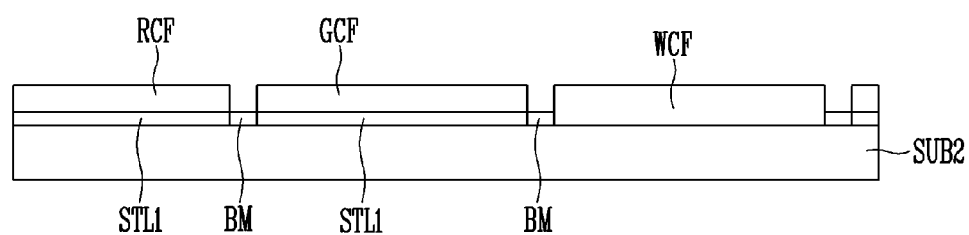

As illustrated in FIG. 14, after forming the first selective transmission layers STL1, the first color filter RCF, the second color filter GCF, and the third color filter WCF are formed.

The first color filter RCF may be arranged on the first selective transmission layer STL1 to correspond to the red pixel RPXL. The second color filter GCF may be arranged on the first selective transmission layer STL1 to correspond to the green pixel GPXL. The third color filter WCF may be arranged on the second base substrate SUB2 to correspond to the blue pixel BPXL.

The first color filter RCF and the second color filter GCF may include the organic material and the quantum dot material dispersed into the organic material. The quantum dot material included in the first color filter RCF absorbs the blue light of the backlight unit (refer to "200" of FIGS. 3A, 3B, 4A, and 4B) and may convert the absorbed blue light into the red light. The quantum dot material included in the second color filter GCF absorbs the blue light and may convert the absorbed blue light into the green light.

In addition, the third color filter WCF may transmit the blue light provided by the backlight unit 200. For example, the third color filter WCF may be the transparent, blue, or white color filter.

Figure 15:
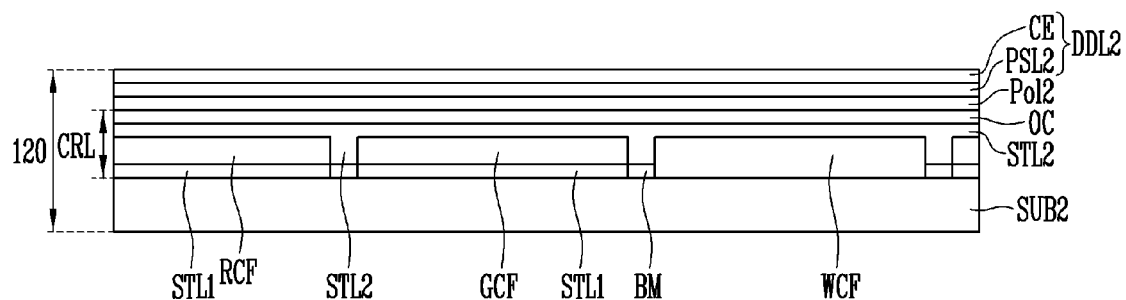

As illustrated in FIG. 15, after forming the first color filter RCF, the second color filter GCF, and the third color filter WCF, the second selective transmission layer STL2 that covers the first color filter RCF, the second color filter GCF, and the third color filter WCF is formed. The second selective transmission layer STL2 may cover areas between the color filters, the color filters RCF, GCF, and WCF, that are adjacent to one another. The second selective transmission layer STL2 reflects the yellow light and may transmit the other light components. Since the yellow light is a mixture of the red light and the green light, the second selective transmission layer STL2 may reflect the red light and the green light converted by the first color filter RCF and the second color filter GCF. In addition, the second selective transmission layer STL2 may reflect the light components excluding the blue light among the light components incident on the third color filter WCF. Therefore, the second selective transmission layer STL2 may improve the color reproducibility of the display panel 100.

After forming the second selective transmission layer STL2, the planarization layer OC is formed on the second selective transmission layer STL2 and the third color filter WCF. The planarization layer OC may include the transparent organic material. Therefore, the planarization layer OC may planarize the surface of the second selective transmission layer STL2.

After forming the color realizing layer CRL, the second polarizing layer Pol2 is formed on the planarization layer OC. The second polarizing layer Pol2 may include the WGP like the first polarizing layer Pol1.

After forming the second polarizing layer Pol2, the second driving layer DDL2 is formed on the second polarizing layer Pol2.

The second driving layer DDL2 may include the second passivation layer PSL2 arranged on the second polarizing layer Pol2 and the common electrode CE arranged on the second passivation layer PSL2. The second passivation layer PSL2 may include at least one of the organic insulating material and the inorganic insulating material. The common electrode CE may include the same material as the pixel electrode PE.

Figure 16:
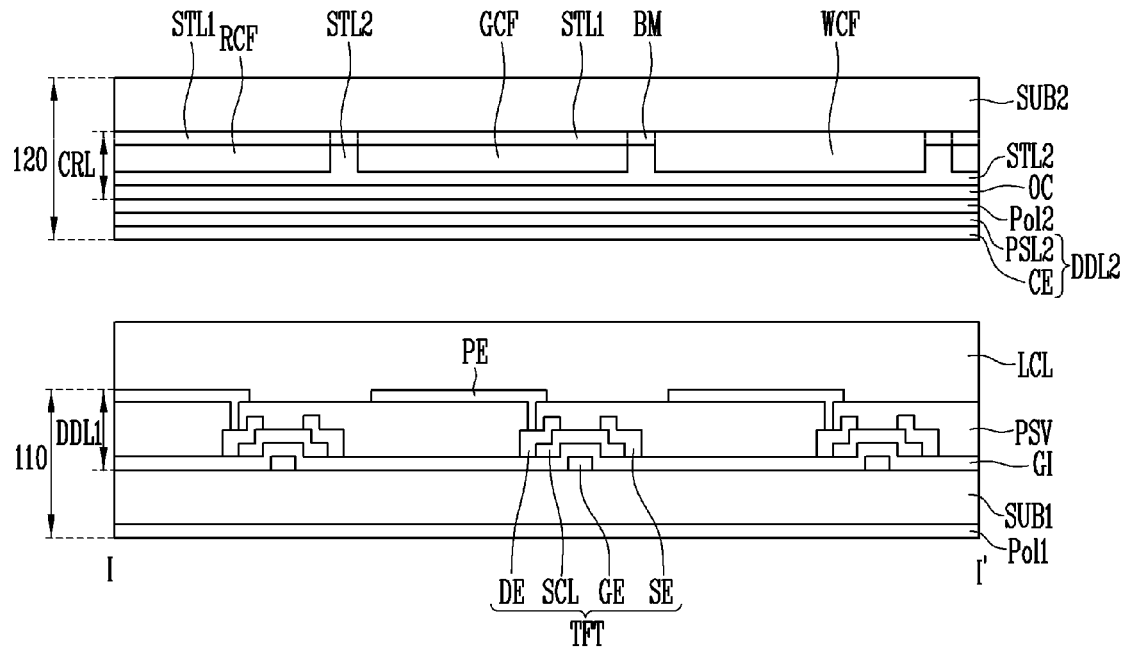

Referring to FIG. 16, the first substrate 110 and the second substrate 120 are arranged to face each other and the liquid crystal layer LCL is arranged between the first substrate 110 and the second substrate 120. The liquid crystal layer LCL may be arranged between the first substrate 110 and the second substrate 120. The liquid crystal molecules of the liquid crystal layer LCL are arranged in the specific direction by the electric field formed by the pixel electrode and the common electrode and may control the transmittance of the light. Therefore, the liquid crystal layer LCL transmits the light provided by the backlight unit 200 so that the LCD panel 100 may realize the image.

According to the current embodiment, it is illustrated that, after arranging the first substrate 110 and the second substrate 120 to face each other, the liquid crystal layer LCL is arranged between the first substrate 110 and the second substrate 120. However, the present inventive concept is not limited thereto. For example, the liquid crystal layer LCL is arranged on the first substrate 110 and the second substrate 120 may be arranged on the liquid crystal layer LCL.

Figure 17:
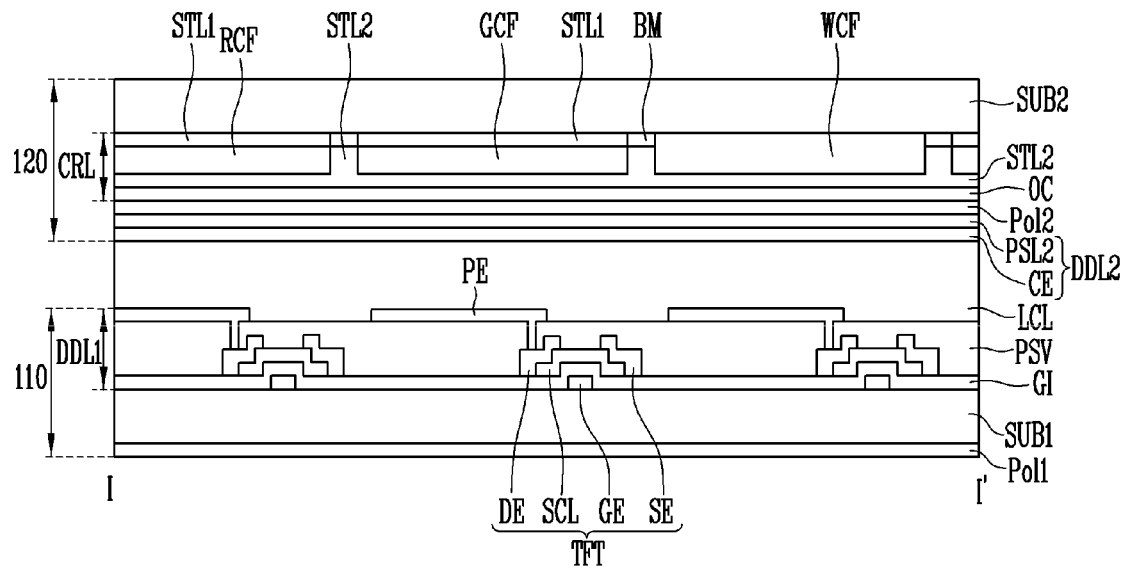

Referring to FIG. 17, the display panel (refer to "100" of FIGS. 3A, 3B, 4A, and 4B) is formed by attaching the first substrate 110 and the second substrate 120 to each other. A sealant (not shown) may be used for attaching the first substrate 110 and the second substrate 120 to each other.

The sealant is arranged in the non-display area (refer to "NDA" of FIG. 1) of the display panel 100 and may surround the non-display area (refer to "NDA" of FIG. 1) of the display panel 100.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present inventive concept as set forth in the following claims.

What is claimed is:

1. A substrate comprising:
a base substrate; and
a light blocking pattern disposed on a surface of the base substrate, the light blocking pattern exposing a part of the base substrate,
wherein the light blocking pattern comprises:
a semi-transmission reflective layer disposed on the base substrate;
a phase matching layer disposed on the semi-transmission reflective layer; and
a reflective metal layer disposed on the phase matching layer, and
wherein the phase matching layer and the reflective metal layer have substantially the same etching rate.

2. The substrate of claim 1, further comprising a transmission protective layer disposed on the reflective metal layer.

3. The substrate of claim 2, wherein an etching rate of a material of the transmission protective layer is substantially the same as etching rates of materials of the phase matching layer and the reflective metal layer.

4. The substrate of claim 1, further comprising a color filter disposed on the base substrate exposed by the light blocking pattern,
wherein the color filter comprises a quantum dot material.

5. The substrate of claim 4, further comprising a first selective transmission layer disposed between the base substrate and the color filter,
wherein the first selective transmission layer blocks blue light.

6. The substrate of claim 5, further comprising a second selective transmission layer that covers the color filter,
wherein the second selective transmission layer reflects yellow light.

7. A display device comprising:
a first substrate;
a second substrate that faces the first substrate; and
a liquid crystal layer disposed between the first substrate and the second substrate,
wherein the first substrate comprises:
a base substrate; and
a light blocking pattern disposed on a surface of the base substrate, the light blocking pattern exposing a part of the base substrate,
wherein the light blocking pattern comprises:
a semi-transmission reflective layer disposed on the base substrate;
a phase matching layer disposed on the semi-transmission reflective layer; and
a reflective metal layer disposed on the phase matching layer, and
wherein the phase matching layer and the reflective metal layer comprise materials having substantially the same etching rate.

8. The display device of claim 7, further comprising a transmission protective layer disposed on the reflective metal layer.

9. The display device of claim 8, wherein an etching rate of a material of the transmission protective layer is substantially the same as etching rates of materials of the phase matching layer and the reflective metal layer.

10. The display device of claim 7, further comprising a color filter disposed on the base substrate exposed by the light blocking pattern,
wherein the color filter comprises a quantum dot material.

11. The display device of claim 10, further comprising a backlight unit disposed to face the second substrate,
wherein the quantum dot material of the color filter converts a color of light provided by the backlight unit into another color.

12. The display device of claim 11,
wherein the backlight unit provides blue light, and
wherein the quantum dot material converts the blue light into red light or green light.

13. The display device of claim 12, further comprising a first selective transmission layer disposed between the base substrate and the color filter,
wherein the first selective transmission layer blocks the blue light.

14. The display device of claim 13, further comprising a second selective transmission layer that covers the color filter,
wherein the second selective transmission layer reflects yellow light.

15. A display device comprising:
a first substrate including a plurality of pixel areas;
a second substrate including a second base substrate that faces the first substrate and a color realizing layer disposed on a surface of the second base substrate;
a liquid crystal layer disposed between the first substrate and the second substrate; and
a backlight unit configured to provide light to the liquid crystal layer,
wherein the color realizing layer comprises:
a light blocking pattern disposed on a surface of the second base substrate, the light blocking pattern exposing the pixel areas of the second base substrate; and
first through third color filters respectively disposed in the pixel areas of the second base substrate to realize different colors, and
wherein at least one of the first through third color filters comprises a quantum dot material and converts light of a first color that is provided by the backlight unit into light of a second color different from the first color, and
wherein the light blocking pattern comprises:
a semi-transmission reflective layer disposed on the second base substrate;
a phase matching layer disposed on the semi-transmission reflective layer; and
a reflective metal layer disposed on the phase matching layer, and
wherein the phase matching layer and the reflective metal layer comprise materials having substantially the same etching rate.

16. The display device of claim 15,
wherein the backlight unit provides blue light,
wherein the first color filter comprises a quantum dot material that converts the blue light into red light,
wherein the second color filter comprises a quantum dot material that converts the blue light into green light, and
wherein the third color filter transmits the blue light.

17. The display device of claim 15, further comprising a transmission protective layer disposed on the reflective metal layer.

18. The display device of claim 17, wherein an etching rate of a material of the transmission protective layer is substantially the same as etching rates of materials of the phase matching layer and the reflective metal layer.

19. The display device of claim 18,
wherein the phase matching layer and the transmission protective layer comprise indium zinc oxide (IZO), and
wherein the reflective metal layer comprises an Al—Ni—La alloy (ANL).

20. The display device of claim 15,
wherein the second substrate further comprises a first selective transmission layer disposed between the second base substrate and the first color filter and between the second base substrate and the second color filter, and
wherein the first selective transmission layer blocks blue light.

21. The display device of claim 20, further comprising a second selective transmission layer that covers at least the first color filter and the second color filter,
wherein the second selective transmission layer reflects yellow light.

22. The display device of claim 15,
wherein the first substrate comprises:
a first base substrate;
a first driving layer including at least one thin film transistor (TFT) disposed on the first base substrate; and
a pixel electrode disposed on the first base substrate and connected to the thin film transistor (TFT), and
wherein the second substrate comprises a second driving layer disposed on the color realizing layer and including a common electrode.

23. The display device of claim 22, further comprising:
a first polarizing layer disposed on the first base substrate; and
a second polarizing layer disposed between the color realizing layer and the second driving layer.

24. The display device of claim 23, wherein the first polarizing layer and the second polarizing layer comprise a wire grid polarizer (WGP).

25. The display device of claim 22, further comprising a planarization layer arranged between the color realizing layer and the second driving layer.

26. A method of manufacturing a display device, the method comprising:
providing a first substrate;
providing a second substrate that faces the first substrate; and
arranging a liquid crystal layer between the first substrate and the second substrate,
wherein the providing of one of the first substrate and the second substrate comprises:
forming a light blocking pattern that exposes a part of a base substrate on the base substrate; and
forming a color filter on the base substrate exposed by the light blocking pattern,
wherein the forming of the light blocking pattern comprises:
sequentially forming a semi-transmission reflective layer, a phase matching layer, and a reflective metal layer on the base substrate; and
etching the semi-transmission reflective layer, the phase matching layer, and the reflective metal layer at one time, and
wherein the phase matching layer and the reflective metal layer comprise materials having substantially the same etching rate.

27. The method of claim 26, further comprising forming a transmission protective layer disposed on the reflective metal layer.

28. The method of claim 27, an etching rate of a material of the transmission protective layer is substantially the same as etching rates of materials of the phase matching layer and the reflective metal layer.

29. The method of claim 28,
wherein the phase matching layer and the transmission protective layer comprise IZO, and
wherein the reflective metal layer comprises ANL.

30. The method of claim 26, further comprising forming a first selective transmission layer disposed between the base substrate and the color filter,
wherein the first selective transmission layer blocks blue light.

31. The method of claim 30, further comprising forming a second selective transmission layer that covers the first color filter and the second color filter, wherein the second selective transmission layer reflects yellow light.

\* \* \* \* \*